United States Patent [19]
Diprose et al.

[11] Patent Number: 4,869,016
[45] Date of Patent: Sep. 26, 1989

[54] MARINE BIOFOULING REDUCTION

[75] Inventors: Michael F. Diprose, Eyam; Edward E. Williams; Brent Knox-Holmes, both of Sheffield, all of England

[73] Assignee: The University of Sheffield, Sheffield, England

[21] Appl. No.: 77,698

[22] PCT Filed: Nov. 28, 1986

[86] PCT No.: PCT/GB86/00725
§ 371 Date: Jul. 15, 1987
§ 102(e) Date: Jul. 15, 1987

[87] PCT Pub. No.: WO87/03261
PCT Pub. Date: Jun. 4, 1987

[30] Foreign Application Priority Data

Nov. 29, 1985 [GB] United Kingdom ............... 8529511
Aug. 19, 1986 [GB] United Kingdom ............... 8620135

[51] Int. Cl.[4] ........................................... A01M 1/22
[52] U.S. Cl. ................................... 43/124; 43/17.1; 114/222
[58] Field of Search .................. 43/124, 17.1; 114/222

[56] References Cited
U.S. PATENT DOCUMENTS

| 1,021,734 | 3/1912 | Delius ............................... 114/222 |
| 2,818,672 | 1/1958 | Kreutzer ............................. 43/17.1 |
| 3,180,047 | 4/1965 | Kreutzer ............................. 43/17.1 |
| 3,241,512 | 3/1966 | Green ............................... 114/222 |
| 3,524,276 | 8/1970 | Thomas .............................. 43/17.1 |
| 3,625,852 | 12/1971 | Anderson ......................... 114/222 |

Primary Examiner—Gene P. Crosby
Attorney, Agent, or Firm—R. A. Giangiorgi

[57] ABSTRACT

A method is disclosed to provide a substantial reduction of marine corrosion in sea water by micro and macro biofouling. An alternating current is generated of a strength and frequency sufficient to shock marine biofouling organisms and sufficient to upset the normal behavior patterns of the marine biofouling organisms entrained in the sea water passing around or through the structure. A second combination of alternating and direct currents are generated between two strategically located electrodes whereby to release into the water around or within the structure controlled amounts of chlorine ions and copper ions to produce an environment actively hostile to potential marine biofouling organisms. The effect of releasing copper ions and chlorine ions simultaneously is that they co-operate in a synergistic manner that greatly enhances the biocidal effect on marine organisms over and above the effect of the separate use of copper ions and chlorine ions.

8 Claims, 1 Drawing Sheet

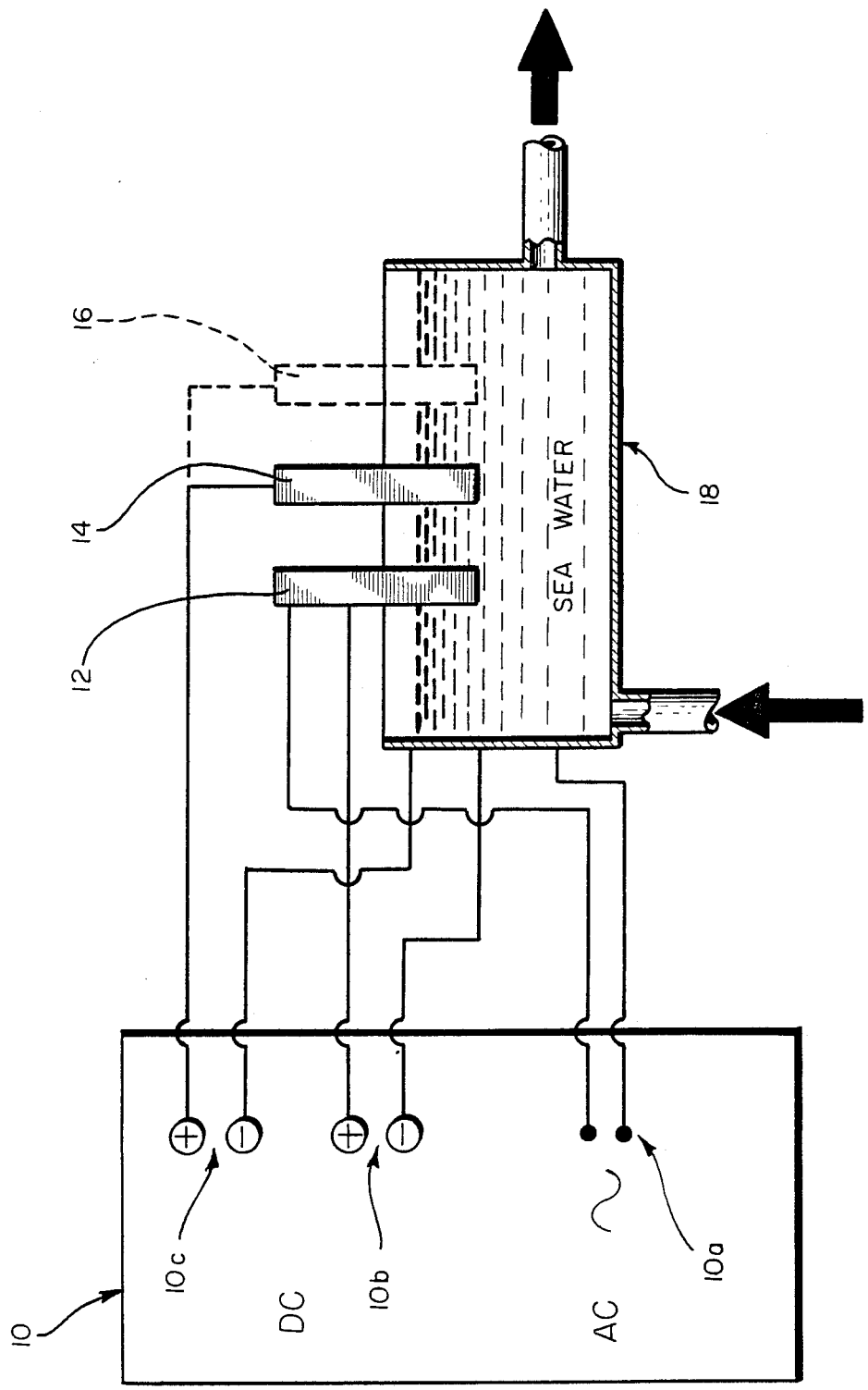

MARINE BIOFOULING REDUCTION

This invention relates to marine biofouling reduction.

There are a number of on-shore and off-shore installations, that utilise sea water either as a substance to be processed e.g. in desalination plants and in the production of sea water magnesia, or in cooling systems in, e.g. power stations or the like. In such usages, large volumes of sea water are drawn through the system. One effect of the intake of large volumes of sea water is an inevitable fouling of the system, in one or both of two forms. Thus, there is marine biofouling caused by the attachment of macroorganisms and microorganisms to the walls of the pipework of the system. If left unattended the build-up of such biofouling organisms can obstruct or even block the system, and to close down the system and clean the affected pipework is expensive and time-consuming. In addition to this there is so-called corrosion fouling where the surface of the material of the pipework or the like itself reacts with substances in the sea water producing either a deposit on or the direct degradation of the surface. Both types of fouling are closely interrelated as microbial biofouling almost invariably leads to corrosion fouling, a phenomenon generally known as microbially induced corrosion.

Similar considerations apply to sea water systems on board ships and to ships hulls and off-shore structures such as oil-rigs in permanent contact with sea water.

Fouling as is mentioned above constitutes a major economic problem it being currently estimated that the cost to the world's petrochemical industry alone exceeds £ 1.4 billion, caused by such items as energy losses due to increased frictional resistance to the passage of water, increased heat transfer resistance, the provision of excess surface areas in heat transfer equipment to compensate for losses, premature replacement due to fouling, loss of power and production due to down time, and the provision for and rectification of safety hazards caused by corrosion failure in such items as heat exchange and associated equipment.

In an attempt to reduce the degree of marine biofouling, it is known to provide a copper electrode at the sea water intake of an installation or e.g., the intake of a cooling system of a ship, or on the surface of a structure sited in sea water, to which a DC current is applied. This causes the release of copper ions into the sea water to poison the marine biofouling organisms. However, micro-biofouling organisms are able to produce an outer skin to provide a degree of immunity to poisoning, and there is the progressive loss of electrode material.

It is the object of the present invention to provide a more effective method of reducing marine biofouling and associated corrosion fouling of sea water systems and on the hulls of ships and exteriors of oil rigs or other offshore installations.

According to a first aspect of the present invention, a method of preventing marine biofouling of structures in contact with sea water comprises generating across the structure an alternating current of a strength and frequency sufficient to shock marine biofouling organisms and sufficient to upset the normal behaviour patterns of the marine biofouling organisms entrained in the sea water passing around or through the structure. The structure may be a body such as a ships hull or the legs of an oil rig, or may be the ducting of a sea water system.

Preferably, the generation of the alternating current is achieved by strategically positioning on the structure appropriate electrodes, e.g., at the inlet to a sea water system, or spaced along the surface of a structure.

The generated electric fields produce a current density dependent on the electrode type, form and value of the impressed current, and by the resistance dictated by the salinity of the sea water and the distance between electrodes, and is adjusted so as to disrupt the settling behaviour, but not sufficiently high to cause the death of organisms. At this general level, there is believed to be a sufficient disruption of the action potentials at the nerve/muscle interfaces to prevent the organisms from adhering to the walls of the system, for a length of time for the organisms to be swept through the system and returned to the open sea, where they subsequently recover. In addition, it is believed that the electric current sensitises the marine biofouling organisms making them more sensitive to the action of chemicals in sea water e.g. heavy metals such as copper and chlorine ions, which are known to have biocidal action.

According to a second aspect of the present invention, a method of preventing marine biofouling and associated corrosion fouling of structures in contact with sea water comprises generating across the structure a combination of alternating and direct currents between two strategically located electrodes whereby to release into the sea water around or within the structure controlled amounts of chlorine ions and copper ions to produce an environment actively hostile to potential marine biofouling organisms.

The effect of releasing copper ions and chlorine ions simultaneously is that they co-operate in a synergistic manner that greatly enhances the biocidal effect on marine organisms over and above the effect of the separate use of copper ions and chlorine ions.

In addition it is preferred to provide a third electrode for the simultaneous release of aluminium ions and which elevates considerably the alkalinity of the sea water to a level that further enhances the biocidal action of the copper and chlorine ions. Micro-organisms are able to produce a skin to resist any acidity in the sea water, or to resist any pollutants such as copper. But such organisms are highly sensitive to any alkalinity, and by ensuring that it is relatively high within a system or around a structure, the effectiveness in the combined effect of chlorine and copper ions is greatly increased.

BRIEF DESCRIPTION OF THE DRAWING

The drawing is a diagrammatic and schematic illustration of a combined AC and DC circuit system in accordance with one embodiment of the present invention.

The electrodes of an appropriate A.C. generating means for the first aspect of the invention can be selected from a number of usable materials such as platinised titanium, copper, and arsenical copper, and can be of rod, bar or plate type or of any other suitable size and shape. By being an A.C. system, there is little errosion of the electrodes which consequently have a considerable useful life, and there are only small amounts of hydrogen and chlorine gas generated, which can be dangerous if they build-up to any appreciably extent, in e.g., the ducting of a sea water system.

The electrodes connected to an appropriate combined AC/DC generating source means 10 for the second aspect of the invention can be selected from a number of usable materials e.g. copper or arsenical copper anode 12 for the release of copper ions, platinised titanium anode 14 for the release of chlorine ions and aluminium anode 16 for the release of aluminium ions. By being a combined AC/DC system and with AC and DC current applied to the copper electrode DC anode 12 and DC current also applied to the platinised titanium anode 14 and aluminium anode 16, a relatively high AC current can be applied to the copper electrode anode 12 for its electric shocking effect, and a lower DC current applied to the copper electrode anode 12 for the release of copper ions, and when there is the maximising of the disturbance of the marine biofouling organisms, with a predictable erosion of the electrodes, at a lower level than when a DC system alone is employed which consequently have a considerable useful life, and by careful control of current there are only small amounts of hydrogen and chlorine gas generated which can be dangerous if they are allowed to build up to any appreciable extent in, e.g. the ducting of a sea water system.

The generation of an electric field between the anodes 12, 14, 16 and cathode 18 produces a current of a density dependent on the electrode type, form, and value of the impressed current, and by the resistance dictated by the salinity of the sea water and the distance between electrodes. The effect on marine biofouling organisms is believed to be the sensitising of them, making them more sensitive to the combined action of the copper and chlorine ions released into the sea water, thereby enhancing their biocidal effect. Although difficult to quantify it is also believed that there is a disruption of the action potentials at the nerve/muscle interfaces of the organisms that reduces their capability of adhering to the walls of the system.

In a series of experiments to test the effectiveness particularly of the second aspect of the invention, sea water was maintained in contact with steelwork and the degree of fouling checked after periods of two months and four months. That degree of fouling was used as a control factor. Simultaneously, sea water was maintained in contact with other steelwork, one having an arsenical copper electrode and a one amp AC generating system, one having a platinised titanium electrode and a one amp DC generating system, one having an arsenical copper and an aluminium electrode with a 50 mA DC system for the copper electrode and a 50 mA DC system for the aluminium electrode, and one as illustrated in the drawing having an arsenical copper electrode anode 12 with a one amp AC system 10a and a 25 mA DC system 10b, a platinised titanium anode 14 and an aluminium anode 14 with a 1A DC system 10c applied to both.

After two and four months the degrees of fouling were measured and compared, with the following results, the control representing 100% fouling

|  | 2 months | 4 months |
| --- | --- | --- |
| Control | 100 | 100 |
| Cu | 32.62 | 88.2 |
| Cl | 24.28 | 62.1 |
| Cu + Al | 28.52 | 68.5 |

|  | 2 months | 4 months |
| --- | --- | --- |
| Cu + Cl + Al | 8.14 | 25.5 |

Thus, after two months, the copper/AC system with its electrical shocking reduced fouling to approximately 32% of the fouling in the control system, with substantially no loss of electrode material. After four months, fouling had still been reduced by a significant 22% in comparison with the control.

With the second aspect of the invention in its preferred form with three electrodes anodes 12, 14, and 16, fouling after two months had been reduced to approximately 8% of that of the control, and to approximately 25% of that of the control after four months. Those other electrodes tested for comparison, whilst showing reductions in fouling in comparison with the control, have significantly higher degrees of fouling in comparison with the second aspect of the invention, and which displayed degrees of fouling reduction at both two months and four months that could not be predicted from the effect of each type of electrode when considered alone.

We claim:

1. A method of preventing marine biofouling and associated corrosion fouling of structures in contact with sea water comprising generating across the structure a combination of alternating and direct currents between strategically located electrodes whereby to release into the sea water around or within the structure controlled amounts of chlorine ions and copper ions to produce an environment actively hostile to potential marine biofouling organisms.

2. A method as in claim 1, wherein a third electrode is provided for the simultaneous release of aluminium ions and which elevates considerably the alkalinity of the sea water to a level that further enhances the biocidal action of the copper and chlorine ions.

3. A method as in claim 1 or claim 2, wherein the electrode materials are of copper or arsenical copper to which an AC and a DC current is applied for the release of copper ions and platinised titanium to which a DC current is applied for the release of chlorine ions.

4. A method as in claim 2, wherein the electrode material is aluminium to which a DC current is applied for the release of aluminium ions.

5. A method of preventing marine biofouling of structures in contact with sea water, comprising simultaneous releasing of copper ions into the sea water around or within the structure and using a coated titanium anode to release chlorine ions from the sea water around or within the structure, and which ions cooperate in a synergistic manner in their combined effect to produce an environment actively hostile to potential marine biofouling organisms.

6. A method as in claim 5 further comprising simultaneous releasing of aluminum ions in order to further enhance the biocidal action of said copper and chlorine ions.

7. A method as in claim 5, wherein said coated titanium anode comprises platinised titanium.

8. A method as in claim 5 comprising using an anode comprising copper for said release of said copper ions.

* * * * *